(12) United States Patent
Horan et al.

(10) Patent No.: US 10,258,057 B2
(45) Date of Patent: Apr. 16, 2019

(54) CHEESE WITH ENHANCED ORGANOLEPTIC AND MELTING PROPERTIES

(75) Inventors: Kathryn J. Horan, Evanston, IL (US); Chad Galer, Glenview, IL (US); Paul V. Gass, Glenview, IL (US); Aaron Steven Handrick, Evanston, IL (US); John A. Hirschey, Winnetka, IL (US); Brian E. LeVine, Evanston, IL (US); Divya S. Reddy, Lake Zurich, IL (US); Carolyn J. Trinka, Schaumburg, IL (US)

(73) Assignee: Kraft Foods Group Brands LLC, Chicago, IL (US)

( * ) Notice: Subject to any disclaimer, the term of this patent is extended or adjusted under 35 U.S.C. 154(b) by 1008 days.

(21) Appl. No.: 13/593,385

(22) Filed: Aug. 23, 2012

(65) Prior Publication Data

US 2013/0052325 A1 Feb. 28, 2013

Related U.S. Application Data

(60) Provisional application No. 61/527,848, filed on Aug. 26, 2011.

(51) Int. Cl.
*A23C 19/076* (2006.01)
*A23C 19/06* (2006.01)

(52) U.S. Cl.
CPC ............ *A23C 19/076* (2013.01); *A23C 19/06* (2013.01)

(58) Field of Classification Search
CPC ........ A23C 19/06; A23C 19/076; A23C 19/09
USPC ............................................ 426/36, 512, 582
See application file for complete search history.

(56) References Cited

U.S. PATENT DOCUMENTS

| | | | | |
|---|---|---|---|---|
| 3,694,231 A | * | 9/1972 | Izzo et al. | 426/385 |
| 5,252,352 A | * | 10/1993 | Banach et al. | 426/580 |
| 2005/0249853 A1 | * | 11/2005 | Merrill et al. | 426/582 |

FOREIGN PATENT DOCUMENTS

WO WO 9624254 A1 * 8/1996

OTHER PUBLICATIONS

PeerTrainer, "Cream Cheese", Jul. 2007, retrieved from the Internet: http://web.archive.org/web/20070731150942/http://peertrainer.com/DFcaloriecounterB.aspx?id=17.*

* cited by examiner

*Primary Examiner* — Lien T Tran
*Assistant Examiner* — Tynesha L McClain-Coleman
(74) *Attorney, Agent, or Firm* — Fitch, Even, Tabin & Flannery LLP

(57) ABSTRACT

Cheese products with improved flavor, texture and melting properties are described as well as methods for producing such cheese products. The cheese product includes blended in cream cheese or cream cheese powder such that the flavor and the melted appearance of the cheese product are enhanced.

18 Claims, 2 Drawing Sheets

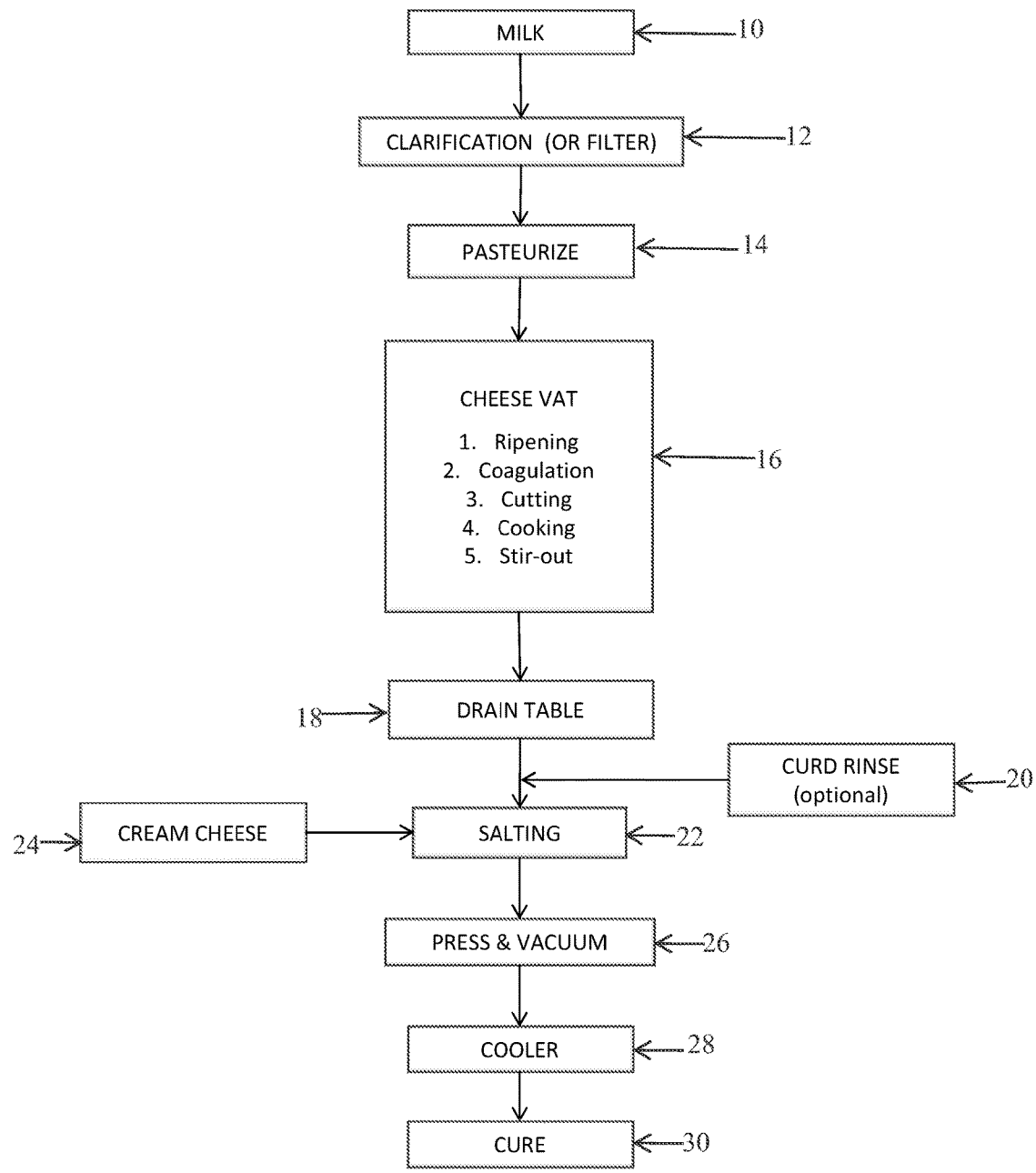

CHEESE WITH ENHANCED ORGANOLEPTIC AND MELTING PROPERTIES

CROSS-REFERENCE TO RELATED APPLICATION

This application claims the benefit of the priority date of provisional Application No. 61/527,848, filed Aug. 26, 2011, which is hereby incorporated herein by reference in its entirety.

FIELD

The present disclosure relates to cheese products with enhanced organoleptic and melting properties and processes for preparing such cheese products.

BACKGROUND

Cheese products are widely consumed among households both domestically and abroad. Traditional natural cheese manufacturing processes involve acidification and coagulation of pasteurized milk, separation of the resulting curds from whey, and salting and pressing of the cheese curds to produce the finished natural cheese. A traditional known natural cheese manufacturing process is illustrated in FIG. 1. As shown in FIG. 1, process cheese can be prepared by blending together natural cheese, emulsifiers, and other ingredients under conditions of heat and shear. Pasteurized process cheese can be heated to at least 150° F. for at least 30 seconds.

When consumers desire a melted cheese product, process cheese can provide certain advantages over natural cheese. Natural cheese that has been melted can have an uneven melted appearance and a tendency to undesirably oil off and solidify quickly upon cooling. In comparison, process cheese can provide a smoother melting product with less oiling off, that will stay creamier longer upon cooling.

Despite these technical advantages of process cheese over natural cheese, process cheese may be less desired by some consumers than natural cheese. For example, some consumers may not desire emulsifying salts in process cheese and prefer products containing more natural ingredients. In addition, process cheese generally contains higher levels of sodium than natural cheese since process cheese contains sodium-based emulsifying salts as well as sodium chloride. Additionally, emulsifying salts tend to modify the flavor of the natural cheeses and often provide a process cheese with a milder and saltier flavor profile, which may be undesirable to many consumers preferring a more natural and intense cheese flavor profile.

Prior attempts to provide a natural cheese product with improved organoleptic and melting characteristics have generally been unsuccessful. For example, dairy solids such as whey protein concentrate, dried whey, whey protein isolate, delactose permeate, casein hydrolyzate, milk fat, lactoalbumin, and nonfat dry milk have previously been incorporated into cheese products with the intention of firming the cheese, binding water, and improving the melted appearance of the cooked cheese. While it is often preferred to incorporate these dairy solids in the form of a comminuted solid, it can be difficult to get the solid additive thoroughly blended into the finished cheese. Pockets or deposits of the additive sometimes survive the cheese-forming operation. The presence of such deposits detracts from the appearance and mouth feel of the cheese, and can adversely affect the taste, texture and melting characteristics of the cheese product as well.

Attempts to address these problems and provide a cheese product with enhanced melting characteristics have been made. One attempt describes a method of preparing a cheese product in which a slurry, including water, milk and/or cream and one or more food additives, is combined with a cheese precursor and processed to form a finished cheese.

Another attempt describes a process for preparing a homogeneous cheese augmented with a food additive in the form of an undissolved solid. A cheese curd is prepared and then grinded while in admixture with either an aqueous solution of at least one cheese emulsifying salt or at least one food additive in the form of a comminuted solid, to obtain a ground curd that is impregnated with the emulsifying salt or food additive. The emulsifier/additive-impregnated ground curd is then formed into the finished cheese.

Yet another attempt provides a process for preparing a soft or semi-soft fibrous cheese (i.e., mozzarella, pasta filata, provolone, or pizza cheese) with enhanced melting characteristics, in which a cheese curd is prepared and then heated, kneaded and stretched to form a homogeneous, fibrous mass of heated, unripened cheese. A minor amount of one or more food additives is thoroughly mixed into the heated, unripened cheese, which is then shaped and cooled in a brine.

These prior methods have required additional ingredients or additional processing of the cheese curd, which may undesirably affect the texture and quality of the finished cheese.

Cheese powders, including, Parmesan, cheddar, Monterey jack, Romano, muenster, Swiss and Provolone, have been added to cheese products to impart a different flavors to the finished cheese product. For example, dairy powder coatings have been topically applied to cheese products. While a topical application of a dairy powder coating can be successful with crumbles, shreds, and cubes of cheese, which can be readily mixed with the dairy powder coating, such a topical application would not be particularly effective in sufficiently coating cheeses in larger forms that are not readily mixable, for example, blocks, wheels, slices, or the like. For example, a topical application of a dairy powder coating to a block of cheese may result in a block of cheese that having a visible powder coating thereon, which may not be visually attractive to many consumers.

SUMMARY

A method of making a cheese product is provided. The method comprises preparing a natural cheese curd other than a cream cheese curd; adding cream cheese to the natural cheese curd and stirring the natural cheese curd and the cream cheese together to obtain a mixture including cream cheese in an amount of about 1% to about 15% of total weight; and pressing the mixture to form the cheese product.

In one approach, the adding of the cream cheese includes adding a cream cheese powder including cream cheese in an amount of about 50% to about 90% of total weight.

In another approach, the adding of the cream cheese includes adding a cream cheese powder including from about 60% to about 70% total fat, from about 8% to about 10% total protein, from about 13% to about 16% total carbohydrates, and a moisture content of up to about 10%.

The adding of the cream cheese can include adding a non-powder cream cheese including from about 33% to about 45% total fat, from about 4% to about 8% protein, and from about 45% to about 55% moisture content.

The adding of the cream cheese can include adding the cream cheese to the natural cheese curd being at a temperature of from about 72° F. to about 90° F.

In one approach, the adding of the cream cheese to the natural cheese curd includes adding the cream cheese to the natural cheese curd in an amount of about 1.5% to about 6% of total weight.

The stirring of the natural cheese curd and the cream cheese together to obtain a mixture can include stirring until the cream cheese is not visible on an exterior surface of the natural cheese curd.

In one approach, the method can include salting the natural cheese curd after the adding of the cream cheese to the natural cheese curd.

The pressing of the mixture to form the cheese product can further include vacuuming the mixture.

In one approach, the cream cheese is selected from a group consisting of cream cheese, cream cheese curd, cream cheese powder, and combinations thereof.

A cheese product is also provided. The cheese product comprises a mixture of natural cheese other than cream cheese and cream cheese powder in an amount of about 1% to about 15% by weight of the cheese product. The cream cheese powder includes from about 60% to about 70% total fat, from about 8% to about 10% protein, from about 13% to about 16% total carbohydrates, and a moisture content of up to about 10%. The cream cheese powder is not visible on an exterior surface of the natural cheese.

The cheese product can include the cream cheese powder in an amount of about 1.5% to about 6% by weight.

The cream cheese powder can include from about 50% to 95% cream cheese.

In one approach, the cream cheese powder includes nonfat milk in an amount of up to 5% of total weight.

In another approach, the cream cheese powder includes sodium phosphate in an amount of up to 5% of total weight.

Another cheese product is also provided. The cheese product comprises a mixture of natural cheese other than cream cheese and a non-powder cream cheese in an amount of about 1% to about 15% by weight of the cheese product. The non-powder cream cheese includes from about 33% to about 45% total fat, and from about 4% to about 8% protein. The non-powder cream cheese is not visible on an exterior surface of the natural cheese.

The cheese product can include the non-powder cream cheese in an amount of about 1.5% to about 6% by weight.

The non-powder cream cheese can include from about 45% to about 55% moisture.

In one approach, the non-powder cream cheese can include nonfat milk in an amount of up to 5% of total weight.

In another approach, the non-powder cream cheese includes sodium phosphate in an amount of less than 5% of total weight.

BRIEF DESCRIPTION OF THE DRAWINGS

FIG. 2 illustrates one example of a method for preparing a cheese product as described herein.

DETAILED DESCRIPTION

Figure 1:
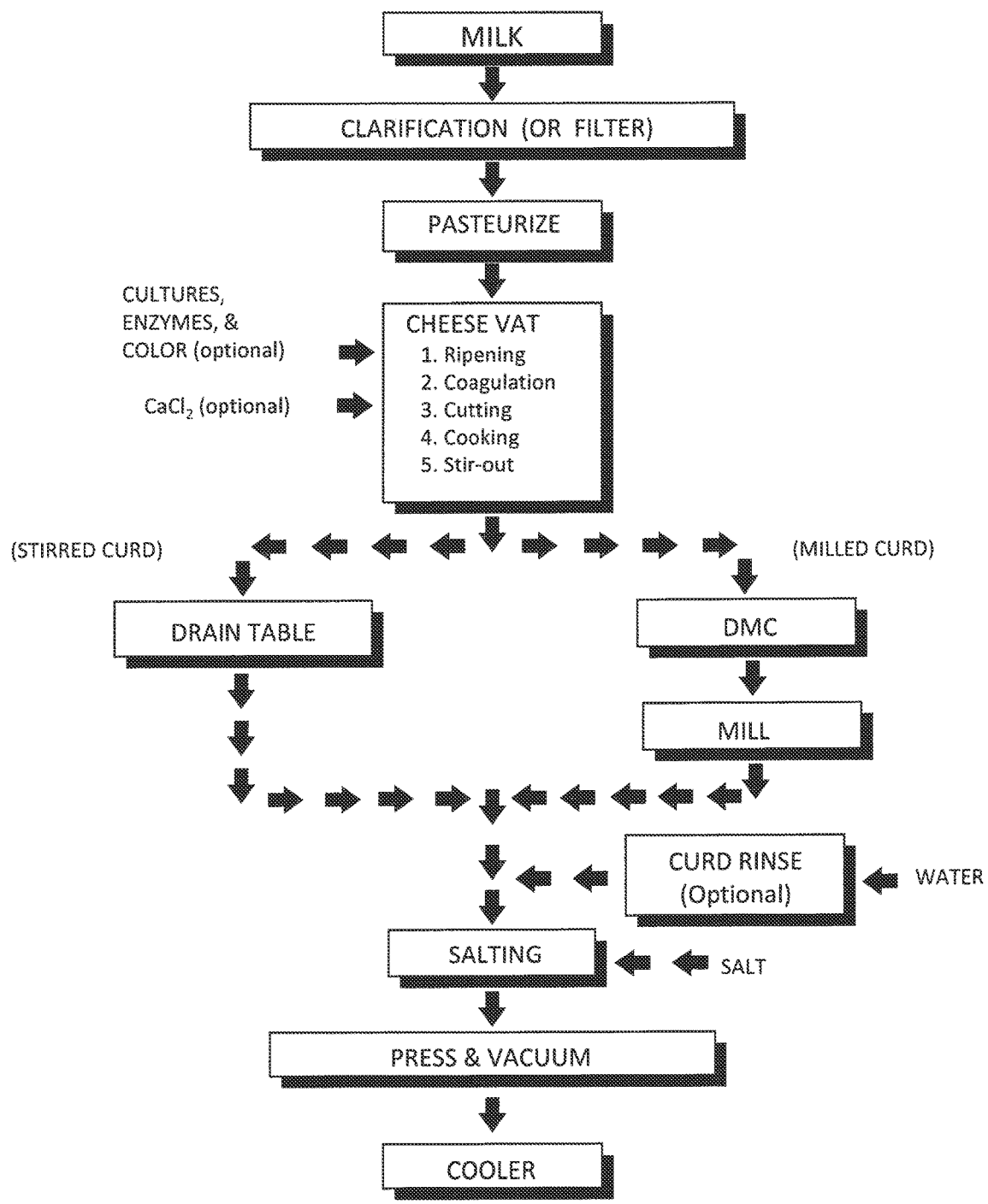
FIG. 1 illustrates a natural cheese manufacturing procedure according to the prior art.

Described herein are cheese products with improved organoleptic and melting properties and processes for preparing such cheese products. In particular, the cheese products described herein advantageously provide desirable attributes of natural cheese, while also providing technical advantages of process cheese such as a smoother texture, an increased melt spread, and a more even melted appearance, without an increased tendency to undesirably oil off and solidify quickly upon cooling.

In particular, we have surprisingly discovered that the addition of cream cheese to the cheese products described herein surprisingly and unexpectedly improves not only the flavor of the cheese product, but also the organoleptic and melting properties of the cheese product. Indeed, the addition of cream cheese to a cheese product has been found to enhance the dairy and dairy acid flavor of the cheese product both cold and hot. Surprisingly, however, the addition of cream cheese to the cheese products has also been found to improve the melted appearance and texture of the cheese product by providing a more even and creamier melted appearance, smoother mouthfeel, and increased melt spread.

Although other dairy powders and cheese powders heretofore have been added to cheese products, cream cheese powder is significantly different from these other powders in taste and texture because cream cheese is a soft, uncured cheese. A soft, spreadable cheese such as cream cheese, would not be expected to impart desirable flavor or texture in a firm or hard cheese such as cheddar and would not be expected to provide a smoother texture or more even melted appearance. In fact, if anything, it would be expected that the addition of cream cheese, with its high fat content and soft texture, could lead to difficulty in knitting curds into a solid block of cheese and thereby negatively impact the texture and melt characteristics of the cheese product. Thus, cream cheese has not heretofore been added to cheese products to improve flavor or organoleptic and melting characteristics. In addition, it was discovered that the amounts of cream cheese added to the non-cream cheese products generally needs to be within a certain range in order to provide the desired organoleptic and melt characteristics. Too much or too little cream cheese negatively affects the melt and other desired characteristics.

Thus, in accordance with one aspect, a cheese product having improved organoleptic and melting properties is provided. The cheese products described herein may be cheese of any variety, other than cream cheese, including, for example, mild cheddar, sharp cheddar, mozzarella, including low-moisture part-skim ("LMPS") mozzarella, Monterey jack, pepper jack, Colby, Romano, Parmesan, asiago, provolone, queso quesadilla, asadero, Havarti, Muenster, or Gouda, among others, and/or blends thereof. In one form, the cheese product is a stirred curd-style cheese or a combination of stirred curd-style cheeses, and may include additional ingredients, such as spices, condiments, other food products, and the like, and combinations thereof. The cheese products may be of any suitable size and shape, including, for example, blocks, barrels, bricks, slices, shreds, cubes, crumbles, and the like.

The cheese products may also be in the form of a cheese precursor including, for example, pasteurized or unpasteurized milk or cream, a coagulum, a cheese curd, and the like, and combinations thereof. Thus, in accordance with another aspect, a cheese curd is provided for preparing a cheese product having improved organoleptic and melting properties.

By one approach, the cheese product comprises cheese or a cheese precursor having cream cheese blended therein in any suitable amount to provide the cheese product with the desired flavor and organoleptic and melting characteristics. In one form, the cheese product comprises a cheese or a cheese precursor other than a cream cheese or a cream cheese precursor. Thus, contrary to the topical addition of a cheese powder to an outer surface of the cheese product, the present application is directed to an incorporation of cream cheese or cream cheese powder into the physical structure of the cheese, such as, for example, by blending. The method described in the present application is advantageous over a topical administration at least in that it provides for a uniform distribution of the cream cheese particles/granules in the cheese product and can result in a cheese product lacking a visible powder on its exterior surface, which is likely to be visually appealing to consumers.

In one form, cream cheese or cream cheese powder is blended into a cheese or cheese precursor in an amount of up to about 15% by weight, in one approach, about 0.5% to about 10% by weight, in another approach, about 1.5% to about 6% by weight, and yet in another approach, about 0.5% to about 4% by weight. In one exemplary approach, cream cheese may be blended into the cheese or cheese precursor in an amount of about 1.5% by weight. In another exemplary approach, cream cheese may be blended into the cheese or cheese precursor in an amount of about 3% by weight. One skilled in the art will appreciate that the amounts of cream cheese blended into to the cheese product will vary based upon the type, texture, and shape of cheese product as well as the type and texture of the cream cheese. It will also be appreciated that the weight percent of cream cheese in the finished cheese product may vary somewhat from the added levels depending on the processing steps used to form the cheese product from cheese precursor. As used herein, blended into the cheese or cheese product generally means, in one approach, that there is substantially no visible or free cream cheese or cream cheese powder on the surface of the cheese product.

The cream cheese blended into the cheese products described herein may be in any suitable form, including, for example, cream cheese, cream cheese curd, cream cheese powder, and the like, and combinations thereof.

In one form, the cream cheese is a cream cheese powder comprising, for example, a dehydrated blend of cream cheese (i.e., pasteurized milk and cream, cheese culture, salt and carob bean gum) and nonfat milk Optionally, sodium phosphate, sodium citrate, or other emulsifying salts may be included in the cream cheese powder. In another form, the cream cheese is a cream cheese powder such as Cream Cheeztang® Cheese Flavor, manufactured by Kraft Food Ingredients.

The cream cheese powders may contain from about 50% to about 99% by weight cream cheese. In one approach, for example, a cream cheese powder will have more than about 50% by weight cream cheese, in another approach, more than about 90% by weight cream cheese. The cream cheese powders can also include nonfat milk in an amount of up to about 5% by weight. The cream cheese powder may optionally include sodium phosphate. In one approach, sodium phosphate may be present in the cream cheese powder in an amount of up to about 5% by weight.

In an approach, a cream cheese powder may contain, for example, about 60% to about 70% total fat, about 8% to about 10% protein, about 13% to about 16% total carbohydrates, and about 1% to about 10% moisture. In one approach, anon-powder cream cheese may contain, for example, about 33% to about 45% total fat, about 4% to about 8% protein, and about 45% to about 55% moisture. In another approach, a non-powder cream cheese may have a reduced fat content and include, for example, about 20% to about 30% total fat, about 4% to about 8% protein, and about 55% to about 65% moisture. In yet another reduced fat content or "light" approach, a non-powder cream cheese may include, for example, about 16% to about 23% total fat, about 4% to about 8% protein, and about 60% to about 70% moisture. It is to be appreciated that while several exemplary cream cheese and cream cheese powders have been provided in this paragraph, any suitable cream cheese composition (e.g., full fat, low fat, non-fat), cream cheese blend including flavored cream cheese, or a cream-cheese like soft cheese may be used in accordance with the principles described herein.

In one approach, the cream cheese powder may contain up to about 3% moisture. Thus, the term "powder" refers to a substantially solid particulate at room temperature or the temperature at which the powder is added, and is not intended to refer to a powder that is devoid of all moisture whatsoever. Moreover, it will be readily understood by a person of ordinary skill in the art that the cream cheese powders described herein may become partially or substantially rehydrated upon addition to the cheese products described herein.

The cream cheese powders may have particles of sufficiently small particle size such that the presence of the cream cheese powder is not immediately apparent upon visual inspection of the cheese product. By one approach, the cream cheese powder has particle sizes that create a flowable powder that may be blended into a cheese or cheese precursor. In another form, the cream cheese powder may be substantially uniformly blended into a cheese or cheese precursor.

In another form, the cheese product may contain additional ingredients, such as spices, condiments or other food pieces, such as chili powder, garlic, onion, paprika, horseradish, peppers, and so forth. In some applications, color or flavor additives such as, for example, annatto coloring and/or smoky flavor may additionally be included as enhancements. In other instances, additives or topical ingredients such as natamycin may be added to improve production efficiency, quality, and/or shelf life of the cheese products.

In accordance with another aspect, methods are provided for preparing the cheese products described herein. Numerous suitable methods may be used to blend cream cheese into the cheese product. By one approach, the cheese product is prepared by adding cream cheese to a cheese precursor during a traditional natural cheese manufacturing process.

As illustrated in FIG. 2, in one approach, a cheese product is prepared by a method including a step of adding cream cheese or cream cheese powder to a cheese curd prepared by a traditional natural cheese manufacturing process. As shown in FIG. 2, the starting material provided in step 10 is milk. In one approach, the milk provided in step 10 is whole fat milk. It will be appreciated that skim milk, milk powder, or any other suitable milk can be used instead of whole fat milk.

The milk can be clarified or filtered in step 12 and pasteurized in step 14. In step 16, the pasteurized milk is then transferred to a cheese vat, where the milk can be subjected to ripening, coagulation, cutting, cooking, and stir-out. The resulting cheese curds are then transferred to a drain table at step 18, where the cheese curds can be subjected to an optional rinse at step 20. By one approach, the cheese curds are cheese curds other than cream cheese curds.

The cheese curds are salted at step 22 and cream cheese is added to the cheese curds at step 24. The cream cheese can be added in a cream cheese powder form, or in any other suitable form. In one approach, the cream cheese is added to the cheese curds prior to the salting step 22. In another approach, the cream cheese is added to the cheese curds simultaneously with the salting step 22, and in yet another approach, the cream cheese is added to the cheese curds after the salting step 22.

By one approach, the step 24 of adding the cream cheese or cream cheese powder includes stirring the cheese curds and cream cheese or cream cheese powder until the cream cheese or cream cheese powder is substantially uniformly distributed in the cheese curds. In one approach, upon being substantially uniformly distributed in the cheese curds, the cream cheese or cream cheese powder is not visible on the exterior surface of the cheese curds. It will be appreciated that in other approaches, the cream cheese powder may also be visible on the cheese curds depending, for example, on the amount of cream cheese or cream cheese powder added to the cheese curds and the color of the cheese curds.

The cheese curds including the cream cheese or cream cheese powder are pressed and vacuumed at step 26, placed in a cooler at step 28, and allowed to cure at step 30 to result in the finished cheese product.

Advantageously, the cream cheese, whether it is cream cheese, cream cheese curd, or cream cheese powder, need not be processed prior to being blended with the cheese curd, for example, by being mixed with a liquid in a slurry or being heated or subjected to shear, etc., to provide a substantially uniformly blended product. Furthermore, the temperature of the cheese curd need not be specifically controlled to provide a substantially uniformly blended product. Generally, the temperature of the cheese curd will be at or near ambient temperature, in the range of about 72° F. to about 90° F.

If the cream cheese powder were added at temperatures significantly above 90° F., for example, above 100° F., or above 110° F. it is expected that there would be very little retention of the cream cheese or cream cheese powder in the cheese curd. In the above-described approach of a Cheddar make after the application of cream cheese or cream cheese powder and salt, the cheese gets filled into forms and pressed extensively. At temperatures higher than 100° F., or higher than 110° F., it is expected that a large amount of the added cream cheese would be also be pressed out, which would be undesirable. Additionally, the cheese curd need not be ground, kneaded, stretched, or homogenized to provide a substantially uniformly blended product.

Cheese products are prepared by blending cream cheese with a cheese precursor in an amount of up to about 15% by weight of the cheese precursor, in one approach, about 0.5% to about 10% by weight, in another approach, about 1.5% to about 6% by weight, in yet another approach, about 0.5% to about 4% by weight, in yet another approach, from about 2% to about 4%, and in yet another approach, from about 3% to about 4% by weight. In one approach, the cream cheese is added to the cheese precursor in an amount of about 1.5%, in yet another approach, the cream cheese is added to the cheese precursor in an amount of about 2%, and in yet another approach, the cream cheese is added to the cheese precursor in an amount of about 3%, and in yet another approach, the cream cheese is added to the cheese precursor in an amount of about 4%. One skilled in the art will appreciate that the amounts of cream cheese or cream cheese powder blended into to the cheese product will vary based upon the type, texture, and shape of cheese product as well as the type and texture of the cream cheese.

The cheese products described herein have been found to have enhanced dairy and dairy acid flavor when eaten cold, with the flavor impressions generally getting stronger as the amounts of cream cheese added increases.

The incorporation of cream cheese into the cheese products described herein also unexpectedly improves the cold texture of the cheese product. In same instances, cheese products containing up to about 15% cream cheese by weight of the cheese product have a softer and less chewy texture when consumed cold compared to cheese products without the added cream cheese. This was particularly surprising in view of the expectation that the incorporation of cream cheese, with its high fat content and soft texture, could lead to difficulty in knitting curds into a solid block of cheese and thereby negatively impact the texture of the cheese product.

The incorporation of cream cheese into the cheese products described herein also surprisingly and unexpectedly improves the melted texture and appearance of the cheese product by providing a creamier mouthfeel when melted, a more even melted appearance, and an increased melt spread. In one form, a cheese product containing cream cheese powder as described herein has an improved melt spread, melting more evenly and completely, when compared to a natural cheese without cream cheese powder and a cheese product containing a different type of cheese powder. The melted cheese product has also been observed to have a softer and smoother mouthfeel when be as compared to control cheese products not containing the cream cheese powder.

These improvements in melt texture and appearance were unexpected, particularly in view of the difficulties that have previously been observed in obtaining a uniformly blended cheese product where dairy solids have been added. Indeed, it would have been expected that the addition of cream cheese, particularly, cream cheese powder, would present similar difficulties such as a difficulty in obtaining a uniformly blended product without any pockets or deposits of additive. Further, given the high fat content of cream cheese, one would have expected cheese products with cream cheese blended therein could exhibit a less even melt with more oiling off, rather than a more even melt without more oiling off as was surprisingly observed.

EXAMPLES

The following examples are presented to illustrate certain aspects and advantages of the cheese products and methods described herein. All percentages are by weight unless indicated otherwise.

Example 1

Exemplary cheese precincts were prepared according to the formulations shown in Table 1 below.

TABLE 1

Formulas For Various Cheese Products

|  | Mild Cheddar | Monterey Jack | Colby Jack | Pepper Jack |
|---|---|---|---|---|
| Pasteurized Milk | 94.84% | 94.74% | 94.73% | 85.86% |
| Sodium Chloride | 1.80% | 1.65% | 1.65% | 1.65% |
| Cheese Culture | 0.35% | 0.60% | 0.60% | 0.48% |

TABLE 1-continued

Formulas For Various Cheese Products

|  | Mild Cheddar | Monterey Jack | Colby Jack | Pepper Jack |
|---|---|---|---|---|
| Annatto Color | 0.007% | — | 0.010% | — |
| Rennet | 0.003% | 0.010% | 0.010% | 0.009% |
| Jalapeño Peppers | — | — | — | 9.00% |
| Acetic Acid | — | — | — | 0.001% |
| Cream Cheese Powder | 3.00% | 3.00% | 3.00% | 3.00% |
| Total | 100% | 100% | 100% | 100% |

The cream cheese powder used in all formulations in Table 1 was Cream Cheeztang® Cheese Flavor, obtained from Kraft Foods Ingredients, comprising a dehydrated blend of about 93% by weight, cream cheese (pasteurized milk and cream, cheese culture, salt, and carob bean gum), about 4% by weight nonfat dry milk, and about 3% by weight sodium phosphate. The nutritional make-up of the cream cheese powder was about 9.7% protein, about 14.5% total carbohydrates, and about 65% total fat.

Example 2

Three batches of mild cheddar cheese product were prepared according to the formula described in Example 1, except that the cream cheese powder was blended into the cheese product in varying amounts—specifically, 2%, 4%, and 6% by weight of the cheese curd. The cream cheese powder was blended into the cheese curd during salting, prior to hooping and pressing the curd into blocks and curing for 26 days.

The cheese block was then evaluated in sliced form in a hot sandwich. The slices were approximately 3.5" by 3.5", with a weight of about 0.75 oz. One slice of cheese product and four slices of thin sliced turkey were placed between two slices of bread and heated for two minutes on each side on an electric griddle set to 350" F.

It was observed that all three amounts of cream cheese powder enhanced the dairy flavor of the melted cheese product, with the dairy flavor impression generally being stronger at higher levels. Surprisingly, the cream cheese powder also improved the melted appearance and texture of the cheese product, giving it a more even melted appearance, a smoother mouthfeel, and increased melt spread. The melt spread results are shown in TABLE 2 below.

TABLE 2

Disc Melt Diameter For Various Levels of Cream Cheese Powder

| % Cream Cheese Powder | Average Disc Melt Diameter (mm) | % Increase in Melt Spread Relative to Control |
|---|---|---|
| 0% (Control) | 31.50 | — |
| 2% | 33.63 | 6.75% |
| 4% | 33.50 | 6.35% |
| 6% | 33.00 | 4.76% |

The results in TABLE 2 demonstrate that the incorporation of cream cheese powder to the cheese product increased the disc melt diameter, indicating an improved melt, relative to a control cheese product including no cream cheese powder. The percent increase in melt spread relative to control was most pronounced in the cheese product incorporating 2% cream cheese powder, with the cheese product incorporating 4% cream cheese powder demonstrating a very similar percent increase in melt spread.

Example 3

Several samples of mild cheddar cheese were prepared according to the formula described in Example 1, except that the cream cheese powder was blended into the cheese product in varying amounts—0% (Control), 3%, 4%, and 5%, by weight of the curd. The cream cheese powder was blended into the cheese curd during salting, prior to hooping and pressing the curd into blocks and curing for 30 days.

A disc melt test was performed on each sample by cutting several 3 gram discs from a cylinder of cheese. The sample discs were heated for 4 minutes in a double boiler in which the water in the lower pot was kept boiling during the tests. The melt spread diameter of each disc was measured in two directions. The results are shown in TABLE 3.

TABLE 3

Disc Melt Diameter For Various Levels of Cream Cheese Powder

| % Cream Cheese Powder | Moisture Content of Cheese | Average Disc Melt Diameter (mm) | % Increase in Melt Spread Relative to Control |
|---|---|---|---|
| 0% (Control) | 37.40% | 36.83 | — |
| 3% | 37.88% | 39.50 | 7.24% |
| 4% | 37.07% | 39.33 | 6.79% |
| 5% | 40.22% | 37.33 | 1.36% |

The results in TABLE 3 demonstrate that the incorporation of cream cheese powder to the cheese product increased the disc melt diameter, indicating an improved melt, relative to a control cheese product including no cream cheese powder. The percent increase in melt spread relative to control was most pronounced in the cheese product incorporating 3% cream cheese powder.

Example 4

Several samples of mild cheddar cheese were prepared according to the formula described in Example 1, except that a different type of cheese powder was added to each sample. In particular, each of the samples included a respective one of—cream cheese powder, Swiss cheese powder, Sharp cheddar cheese powder, Parmesan cheese powder, Ricotta cheese powder, and Mozzarella cheese powder. The cheese powders were blended into the cheese curd at 3% by weight during salting, prior to hooping and pressing the curd into blocks and curing for 30 days.

A disc melt test was performed on each sample by cutting several 3 gram discs from a cylinder of cheese. The sample discs were heated for 4 minutes in a double boiler in which the water in the lower pot was kept at boiling temperature during the test. The melt spread diameter of each disc was measured in two directions. The results are shown in TABLE 4.

TABLE 4

Disc Melt Diameter For Various Cheese Powders

| Cheese Powder | Moisture Content of Cheese | Average Disc Melt Diameter (mm) | % Decrease in Melt Spread Relative to Cream Cheese Powder (Control) |
|---|---|---|---|
| Cream Cheese Powder (Control) | 39.67% | 36.17 | — |
| Swiss Cheese Powder (Comparative) | 40.95% | 35.83 | 0.92% |
| Sharp Cheddar Cheese Powder (Comparative) | 41.23% | 34.00 | 5.99% |
| Parmesan Cheese Powder (Comparative) | 42.02% | 35.00 | 3.23% |
| Ricotta Cheese Powder (Comparative) | 38.74% | 33.33 | 7.83% |
| Mozzarella Cheese Powder (Comparative) | 40.18% | 33.50 | 7.37% |

The results in Table 4 demonstrate that the incorporation of cream cheese powder into the cheese product provided an enhanced melt spread percentage indicative of an improved melt relative to cheese products containing the other types of cheese powders shown in TABLE 4.

Example 5

A consumer taste test was performed to compare a cheese product as described herein to a control cheese containing no cream cheese. Specifically, a mild cheddar cheese product prepared according to the formula of Example 1 (i.e. 3% cream cheese powder) was compared with a control cheddar cheese having no cream cheese powder and to a cheddar cheese having about 4% cream cheese powder. The cheese products were evaluated by the respondents in sliced form in a hot sandwich. One slice of cheese product and 4 slices of thin sliced turkey were placed between two slices of bread and heated for two minutes on each side on an electric griddle set to 350" F.

Based upon a self-administered questionnaire more respondents rated a mild cheddar cheese product containing 3% cream cheese powder higher than the control cheese in terms of cheese creaminess in a melted sandwich. More specifically, a significantly greater number of respondents rated the cheese product with 3% cream cheese powder as having melted better and having better in-mouth texture. Additionally, a greater number of respondents rated the cheese product with 3% cream cheese powder as being more smooth in the mouth.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

What is claimed is:

1. A method of making a cheese product, the method comprising:
    preparing a non-homogenized natural cheese curd other than a cream cheese curd;
    adding solid cream cheese to the non-homogenized natural cheese curd when the non-homogenized natural cheese curd is at a temperature of about 72° F. to about 90° F. and stirring the non-homogenized natural cheese curd and the solid cream cheese together to obtain a mixture including the non-homogenized natural cheese curd and the solid cream cheese, the solid cream cheese being present in the mixture in an amount of about 1% to about 15% of total weight of the mixture; and
    pressing the mixture including the non-homogenized natural cheese curd and the solid cream cheese to form the cheese product.

2. The method of claim 1, wherein the adding of the solid cream cheese to the non-homogenized natural cheese curd includes adding the solid cream cheese to the non-homogenized natural cheese curd in an amount of about 1.5% to about 6% of total weight of the mixture.

3. The method of claim 1, wherein the stirring of the non-homogenized natural cheese curd and the solid cream cheese together to obtain the mixture includes stirring until the solid cream cheese is not visible on an exterior surface of the non-homogenized natural cheese curd.

4. The method of claim 1, further comprising salting the non-homogenized natural cheese curd after the adding of the solid cream cheese to the non-homogenized natural cheese curd.

5. The method of claim 1, wherein the pressing of the mixture to form the cheese product further includes vacuuming the mixture.

6. A cheese product comprising a non-homogenized natural cheese curd other than cream cheese and cream cheese powder, the cream cheese powder being in an amount of about 1% to about 15% by weight of the cheese product, the cream cheese powder including from about 60% to about 70% total fat, from about 8% to about 10% protein, from about 13% to about 16% total carbohydrates, and a moisture content of up to about 10%, wherein the cream cheese powder is incorporated into a physical structure of the non-homogenized natural cheese curd in the cheese product and is not visible on an exterior surface of the non-homogenized natural cheese curd in the cheese product.

7. The cheese product of claim 6, wherein the cheese product includes the cream cheese powder in an amount of about 1.5% to about 6% by weight of the cheese product.

8. The cheese product of claim 6, wherein the cream cheese powder includes from about 50% to 95% cream cheese.

9. The cheese product of claim 6, wherein the cream cheese powder includes nonfat milk in an amount of up to 5% of total weight.

10. The cheese product of claim 6, wherein the cream cheese powder includes sodium phosphate in an amount of up to 5% of total weight.

11. A cheese product comprising a non-homogenized natural cheese curd other than cream cheese and a non-powder cream cheese, the non-powder cream cheese being in an amount of about 1% to about 15% by weight of the cheese product, the non-powder cream cheese including from about 33% to about 45% total fat, and from about 4% to about 8% protein, wherein the non-powder cream cheese is incorporated into a physical structure of the non-homogenized natural cheese curd in the cheese product and is not visible on an exterior surface of the non-homogenized natural cheese curd in the cheese product.

12. The cheese product of claim 11, wherein the cheese product includes the non-powder cream cheese in an amount of about 1.5% to about 6% by weight of the cheese product.

13. The cheese product of claim 11, wherein the non-powder cream cheese includes from about 45% to about 55% moisture.

14. The cheese product of claim 11, wherein the non-powder cream cheese includes nonfat milk in an amount of up to 5% of total weight.

15. The cheese product of claim 11, wherein the non-powder cream cheese includes sodium phosphate in an amount of less than 5% of total weight.

16. The method of claim 1, wherein the adding of the solid cream cheese to the non-homogenized natural cheese curd and the stirring of the non-homogenized natural cheese curd and the solid cream cheese together further comprises blending the solid cream cheese into a physical structure of the non-homogenized natural cheese curd such that the solid cream cheese is not visible on an exterior surface of the non-homogenized natural cheese curd.

17. The cheese product of claim 6, wherein the cream cheese powder is blended into the physical structure of the non-homogenized natural cheese curd in the cheese product.

18. The cheese product of claim 11, wherein the non-powder cream cheese is blended into the physical structure of the non-homogenized natural cheese curd in the cheese product.

\* \* \* \* \*